Feb. 2, 1965     J. R. WALD, JR., ETAL     3,168,412
REFLECTORIZING APPARATUS AND METHOD
Original Filed Feb. 13, 1958     15 Sheets-Sheet 1

INVENTORS
John R. Wald Jr.
Rufus W. Wilson
Robert B. Bagshaw
BY Karl W. Flocks
ATTORNEY

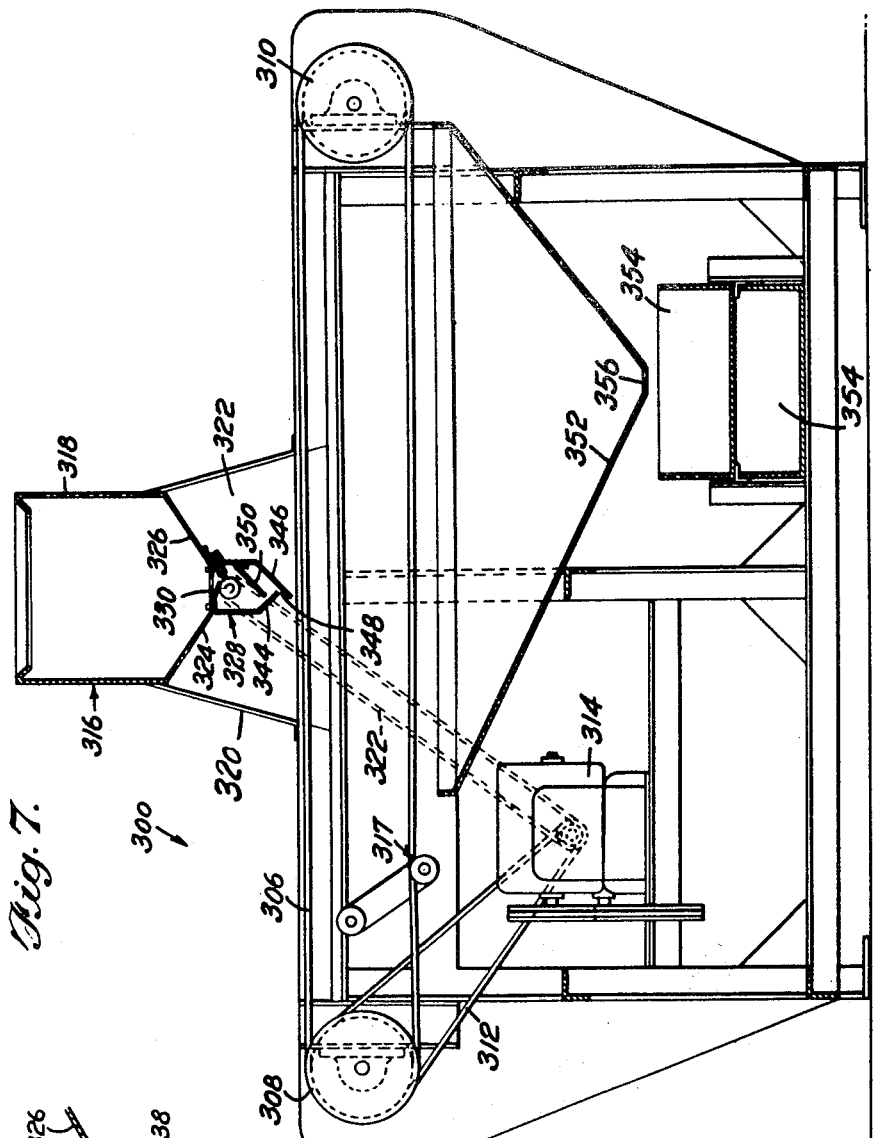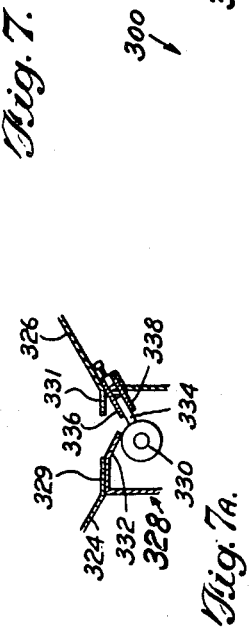

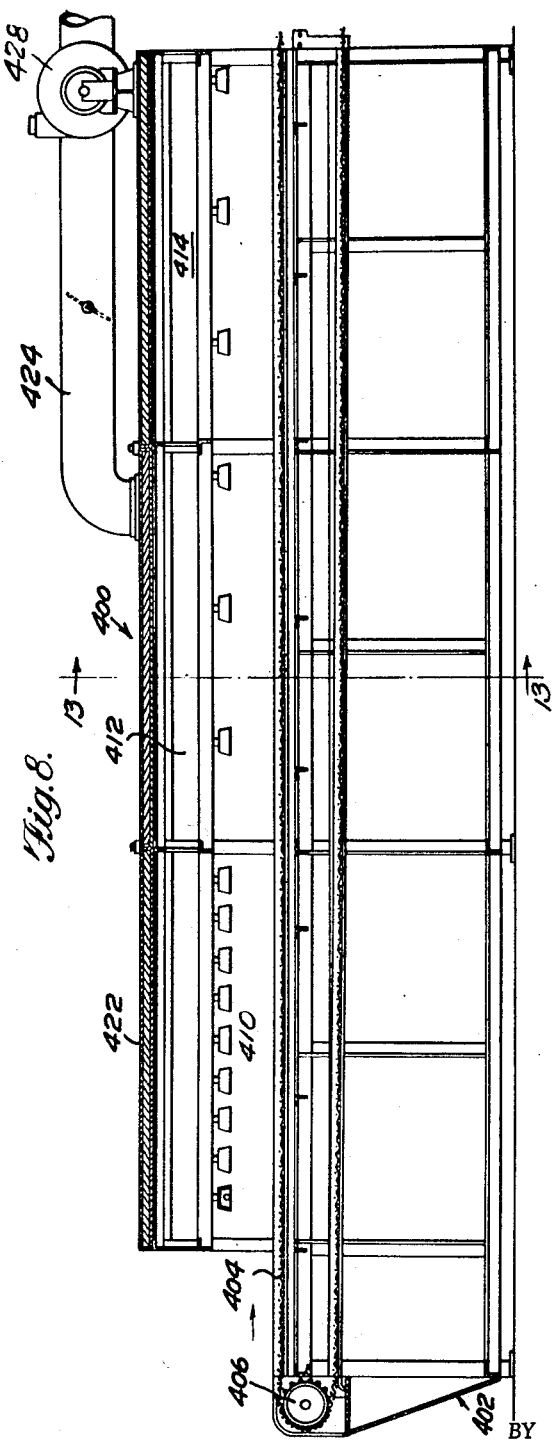
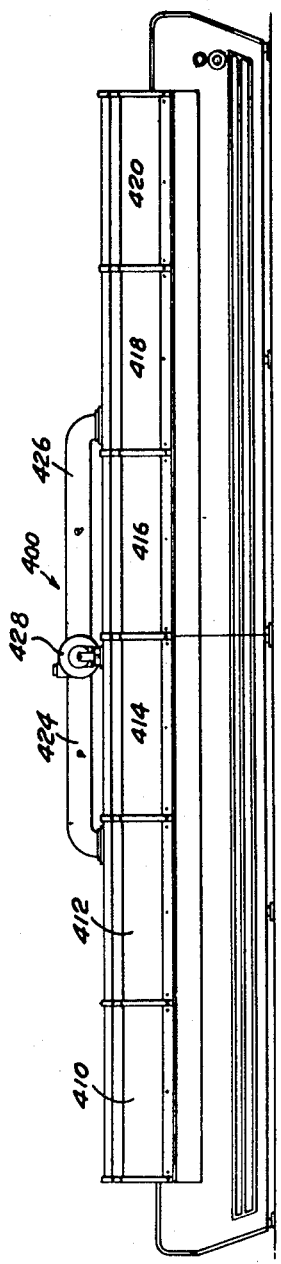
Fig. 8.
Fig. 9.

Feb. 2, 1965 J. R. WALD, JR., ETAL 3,168,412
REFLECTORIZING APPARATUS AND METHOD
Original Filed Feb. 13, 1958 15 Sheets-Sheet 9
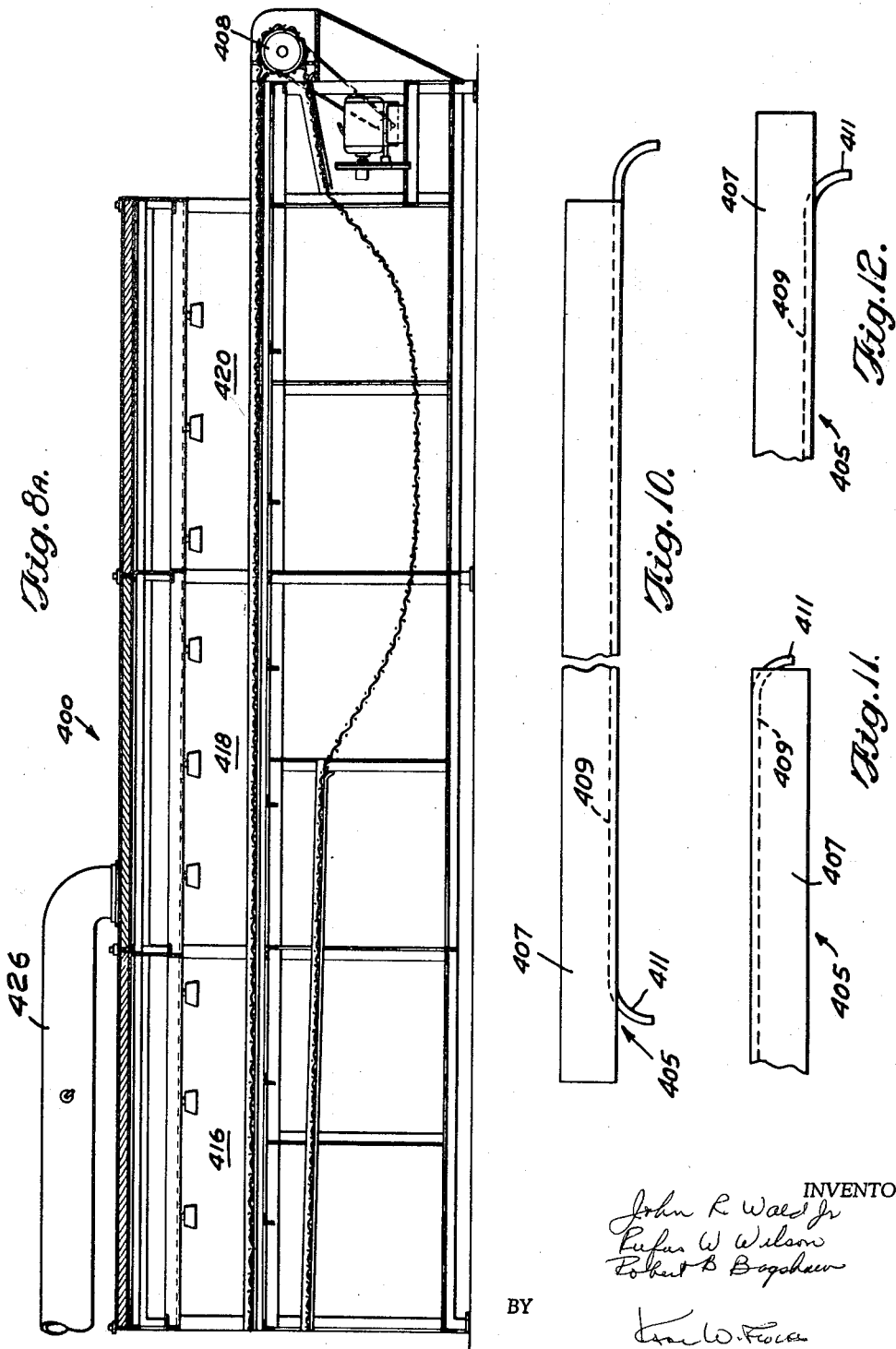
INVENTORS
John R. Wald Jr.
Rufus W. Wilson
Robert B. Bagshaw
BY
ATTORNEY Feb. 2, 1965 J. R. WALD, JR., ETAL 3,168,412
REFLECTORIZING APPARATUS AND METHOD
Original Filed Feb. 13, 1958 15 Sheets-Sheet 10

INVENTORS
John R Wald Jr
Rufus W Wilson
Robert B. Bagshaw
BY
[signature]
ATTORNEY

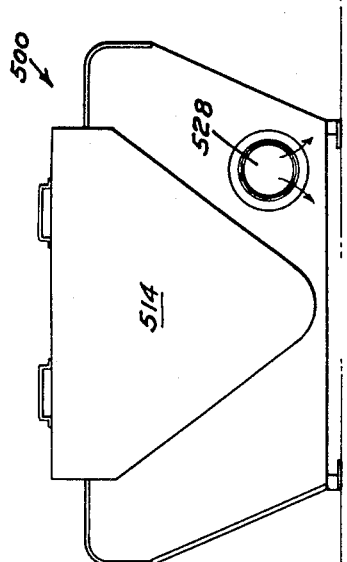
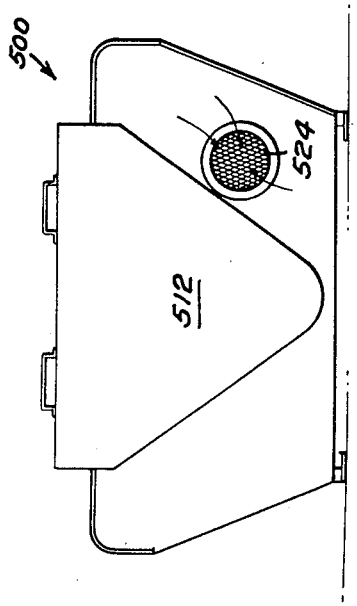
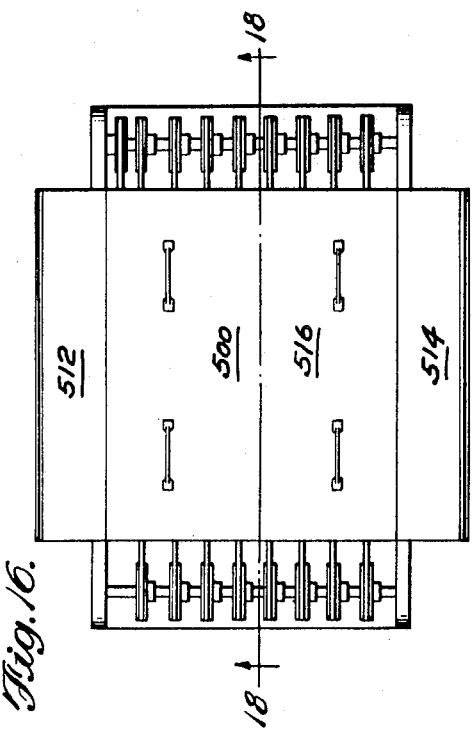
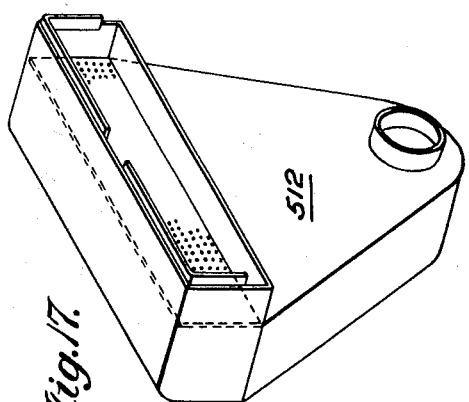

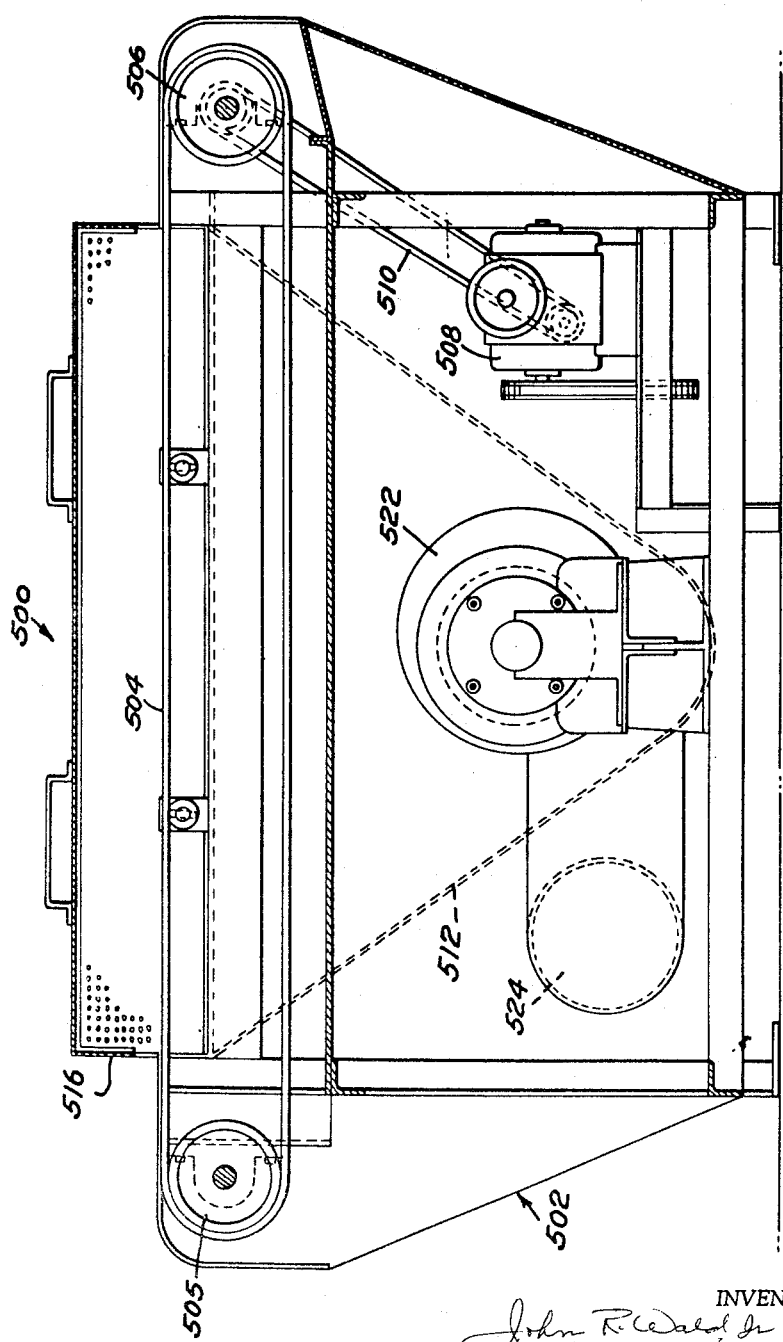

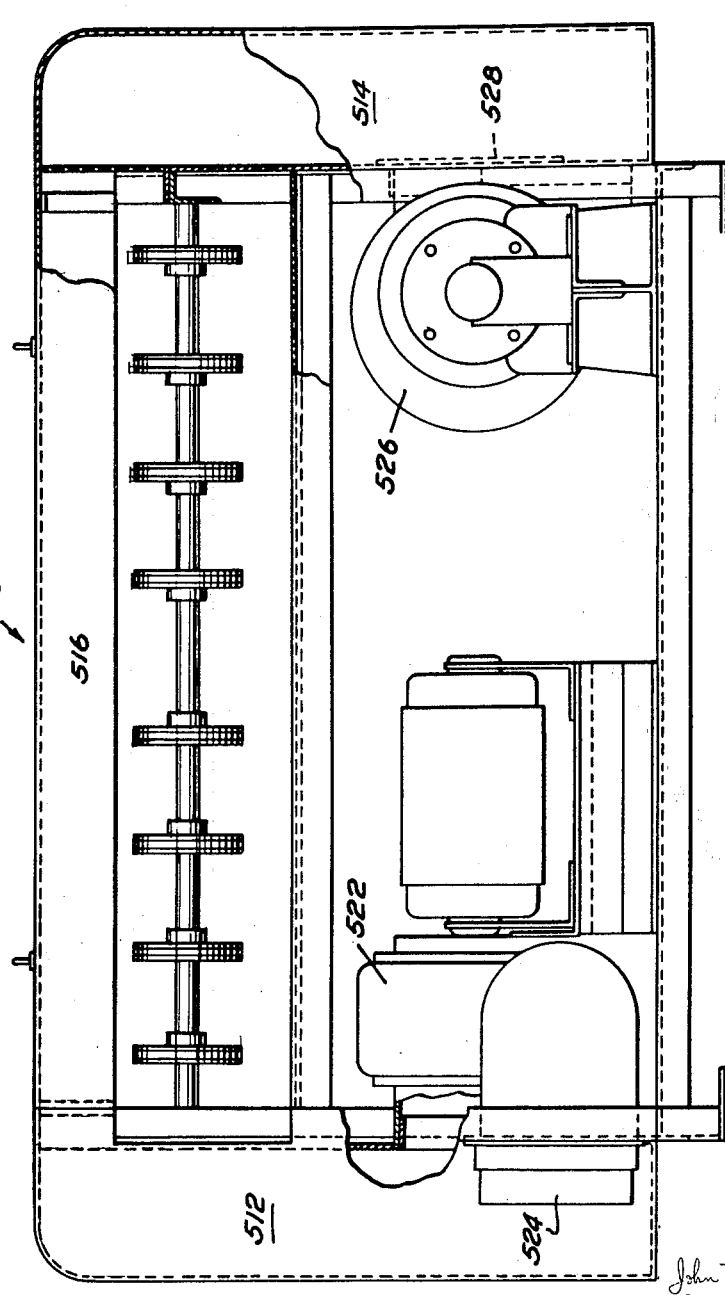

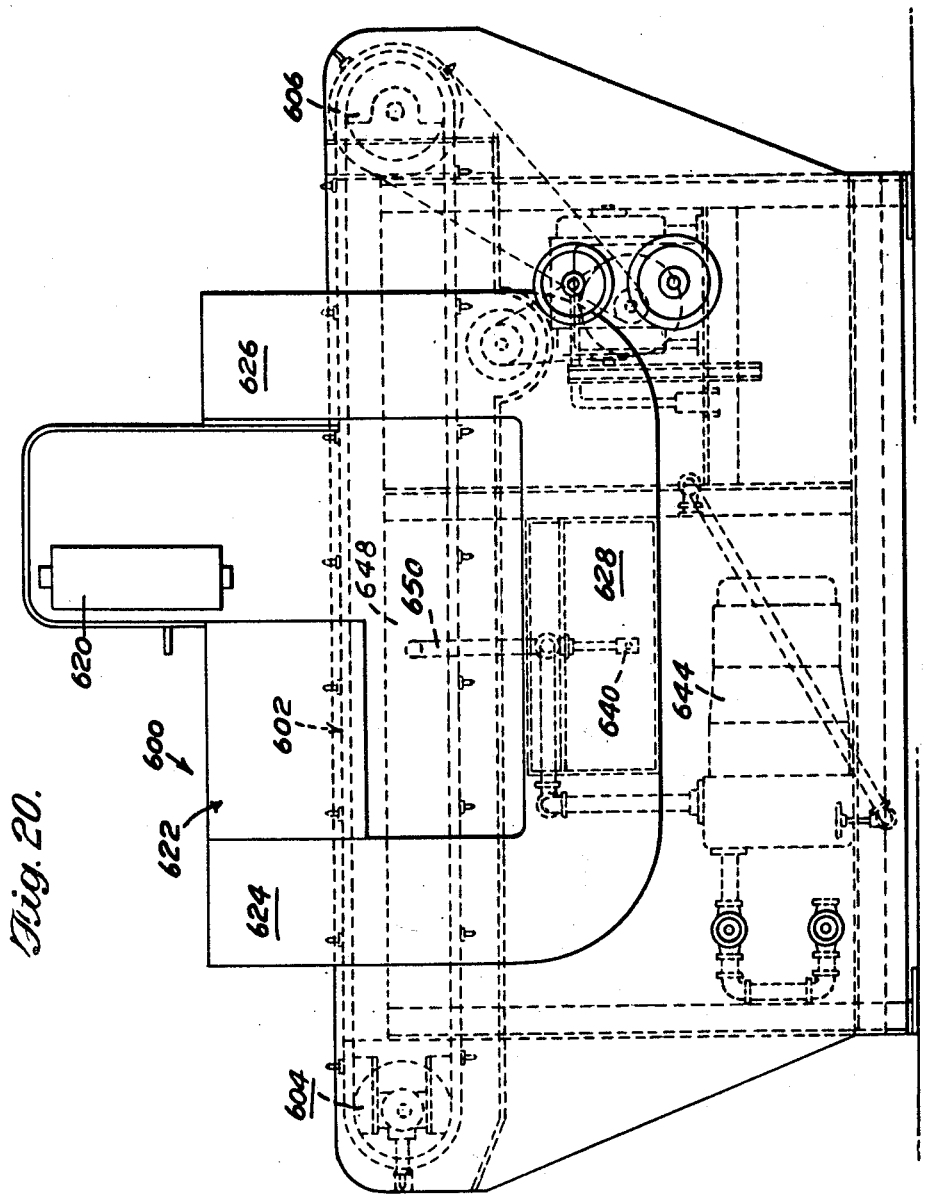

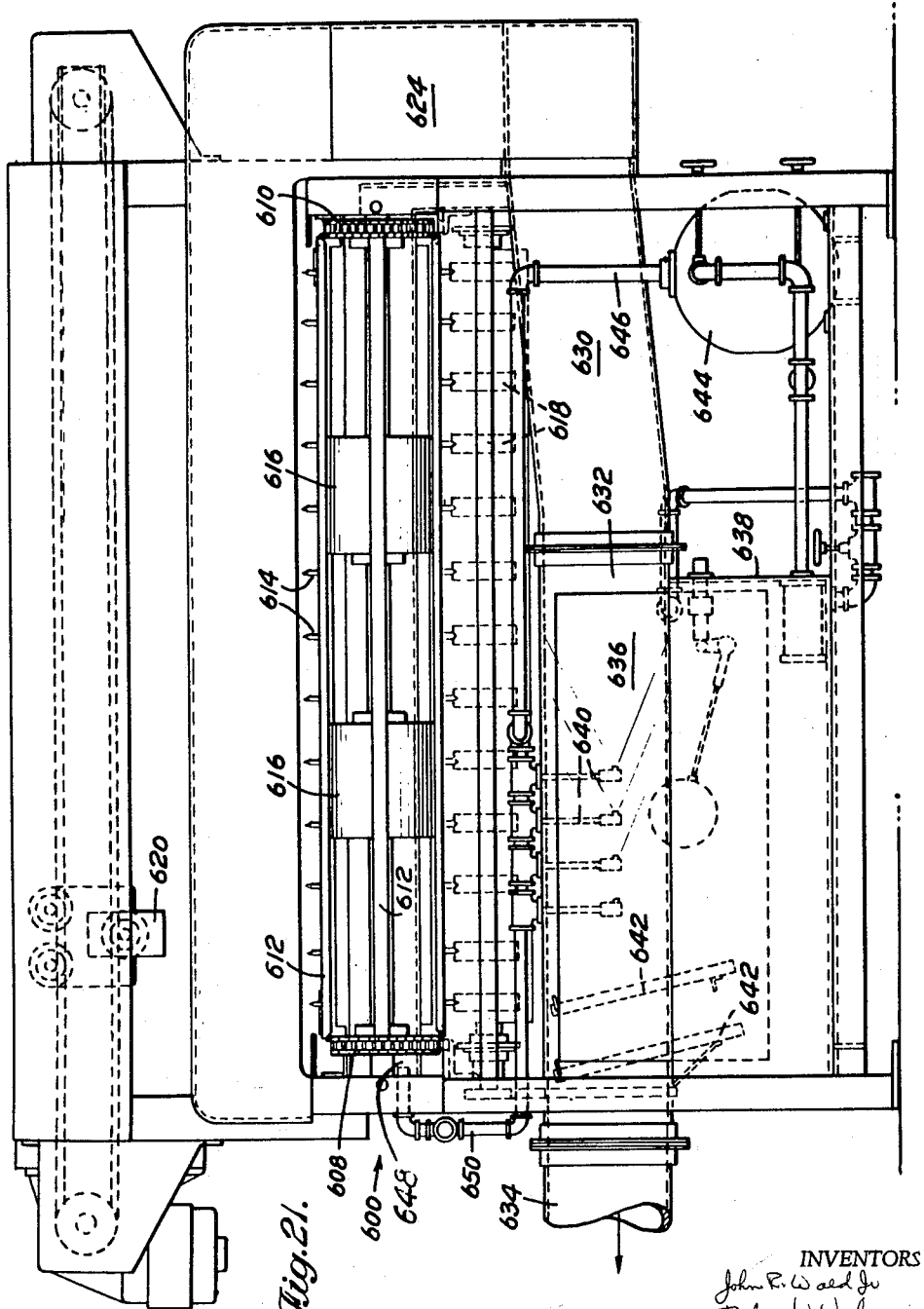

United States Patent Office 3,168,412
Patented Feb. 2, 1965

3,168,412
REFLECTORIZING APPARATUS AND METHOD
John R. Wald, Jr., Rufus W. Wilson, and Robert B. Bagshaw, Huntingdon, Pa., assignors to Wald Industries, Inc., Huntingdon, Pa., a corporation of Pennsylvania
Continuation of application Ser. No. 715,114, Feb. 13, 1958. This application Feb. 21, 1961, Ser. No. 91,301
16 Claims. (Cl. 117—33)

This invention relates to an apparatus and method for the continuous finishing of signs, license plates and the like, and more particularly to an apparatus and method for applying reflectorizing components to metal signs, license plates and the like and to thermally treating and to subsequently cooling the applied reflectorizing material. This application is a continuation of Serial No. 715,114, filed February 13, 1958, now Patent Number 3,009,439, which in turn is a continuation-in-part of application Serial No. 660,099, filed May 20, 1957 now abandoned.

In the manufacture of metal signs and license plates reflectorizing materials such as glass sphere reflectorizing components are applied to the surface of the signs. The application of such reflectorizing materials requires a preliminary application of a binder which may be sprayed or otherwise applied to the surface of the metal sign, after which the glass sphere or other reflectorizing components are applied to the surface having the binder applied thereon, the reflectorizing components being held in place by the binder. After the application of the reflectorizing components or glass spheres to the binder-coated surface, the sign or license plate may then be baked.

Prior to the instant invention, apparatus for the application of binder-held reflectorizing material to metal surfaces has been very expensive, cumbersome and inefficient and has entailed the expenditure of large sums of money. The space occupied by such prior installations has been so large that they have not been utilized generally, it being considered impractical from a commercial point of view to utilize the installations of the prior art in those instances where economy of first cost and space are critical requirements.

A further disadvantage of the prior reflectorizing installations is that inadequate means are provided for collecting the unused binder material or binder mist which does not contact the work in such manner as to prevent this unused binder material from contacting the metal ducts and other portions of the reflectorizing apparatus. As a result of this inadequacy, the ducts and certain other portions of prior reflectorizing apparatus soon become clogged up and rendered inefficient or unusable due to the precipitation thereon of the unused binder material.

Another difficulty which has been experienced in prior apparatus for applying reflectorizing material such as glass beads to a binder-coated metal surface is that the reflectorizing material is improperly protected from moisture-laden air in the vicinity of the reflectorizing component dispensing means, with the result that the reflectorizing glass spheres or the like become coated with moisture in such manner as to interfere with the proper action of the binder material on the spheres.

Still a further difficulty which has been encountered in the reflectorizing apparatus of the prior art is that the heating devices used in binder-baker ovens of the prior art have been distributed and arranged in such manner as to result in poor coordination with the remainder of the production line, this difficulty becoming more pronounced because of space limitations which are usually present in installations of this type.

Still another difficulty encountered in prior art reflectorizing apparatus is that a single conveyor has sometimes been used for carrying the work pieces past a spraying station and subsequently through a baking station. As a result, accumulations of binder from the spraying station have built up on the conveyor which cause a shut-down of the equipment.

Accordingly, it is an object of the instant invention to provide a coordinated and integrated sign reflectorizing apparatus occupying a minimum of longitudinal space and including an automatic binder spray and down-draft mist separating stage, a controlled loader stage for dispensing the reflectorizing material, a zoned binder-baker stage, and a high-pressure after cooling stage.

It is another object of the instant invention to teach a novel apparatus and method for reflectorizing signs, license plates and the like at low first cost and low operational cost.

It is still another object of the instant invention to teach a novel organization of application stage components and thermal treatment stage components in a sign reflectorizing apparatus which results in a superior product capable of production at low cost and requiring only a minimum space allocation.

A further object of the instant invention is to provide a sign and license plate reflectorizing apparatus including means for separating the down-draft mist at the spraying station in such manner as to prevent the unused binder material from escaping into the atmosphere to cause the clogging and coating of portions of the reflectorizing apparatus.

A still further object of the invention is to provide a sign reflectorizing apparatus including means for preventing substantial accumulation of moisture on the material being loaded at the dispensing station to thereby improve the bond between the material being loaded and the binder on the metal surface of the sign or license plate.

Still a further object of the invention is to provide a reflectorizing apparatus including a baking stage having heating units which are distributed in such manner as to properly coordinate with the remainder of the production line and having an improved space factor as compared to baking units used in the prior art reflectorizing apparatus.

Still a further object of the invention is to provide a reflectorizing apparatus in which at least two conveyors are used so as to provide a break in the conveyor system between the spraying and baking stages of the apparatus.

Other objects and the nature and advantages of the instant invention will be apparent from the following description taken in connection with the accompanying drawings wherein:

FIG. 1 and FIG. 1A are broken views in side elevation of the apparatus in accordance with the invention;

FIG. 5A is a detailed view in end elevation of the spray head assembly, showing details of the spray width control means;

FIG. 7 is a longitudinal vertical section taken along the line 7—7 of FIG. 6 and looking in the direction of the arrows;

FIG. 7A is an enlarged detail view of parts shown in FIG. 7A;

Figure 1:
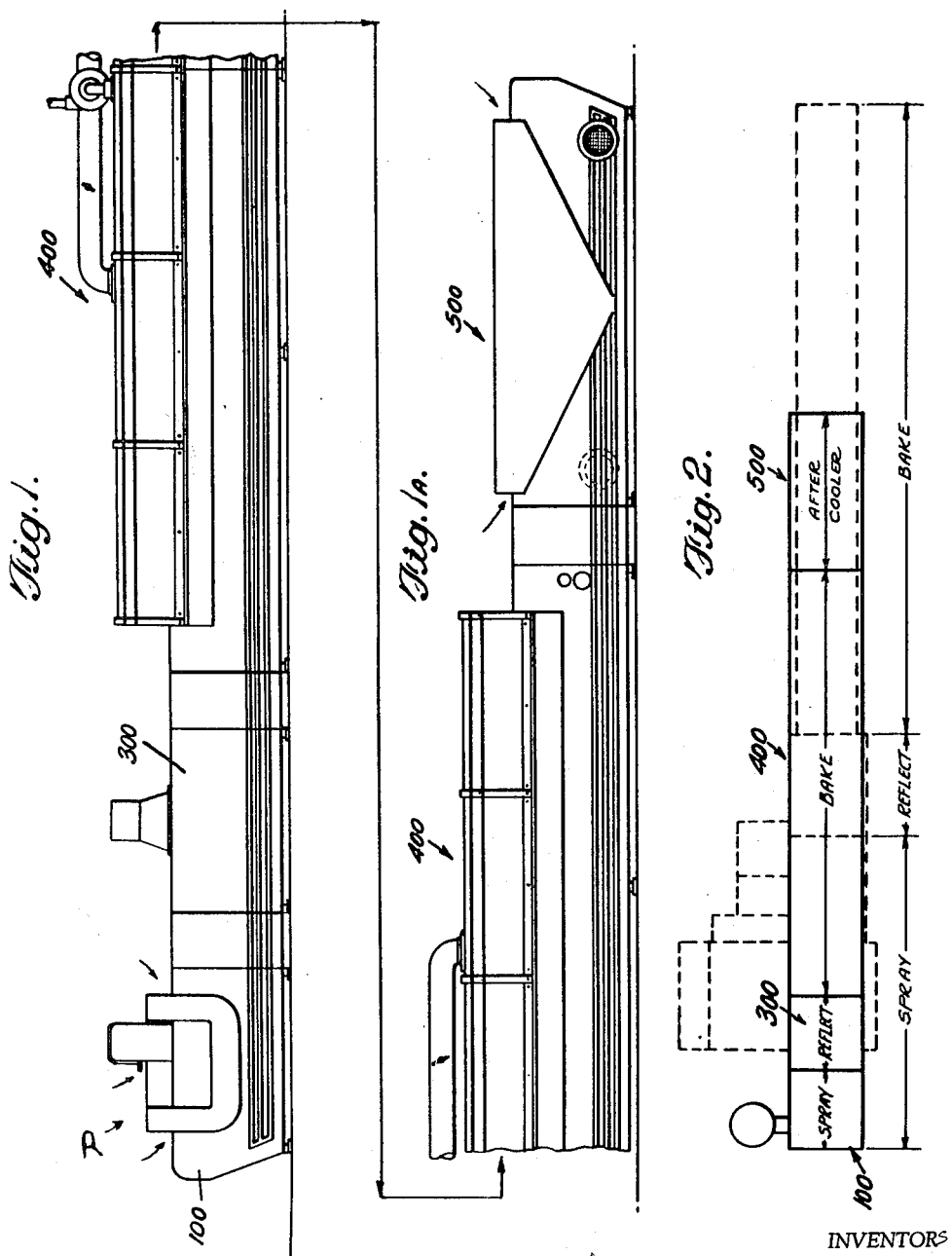
Figure 2:
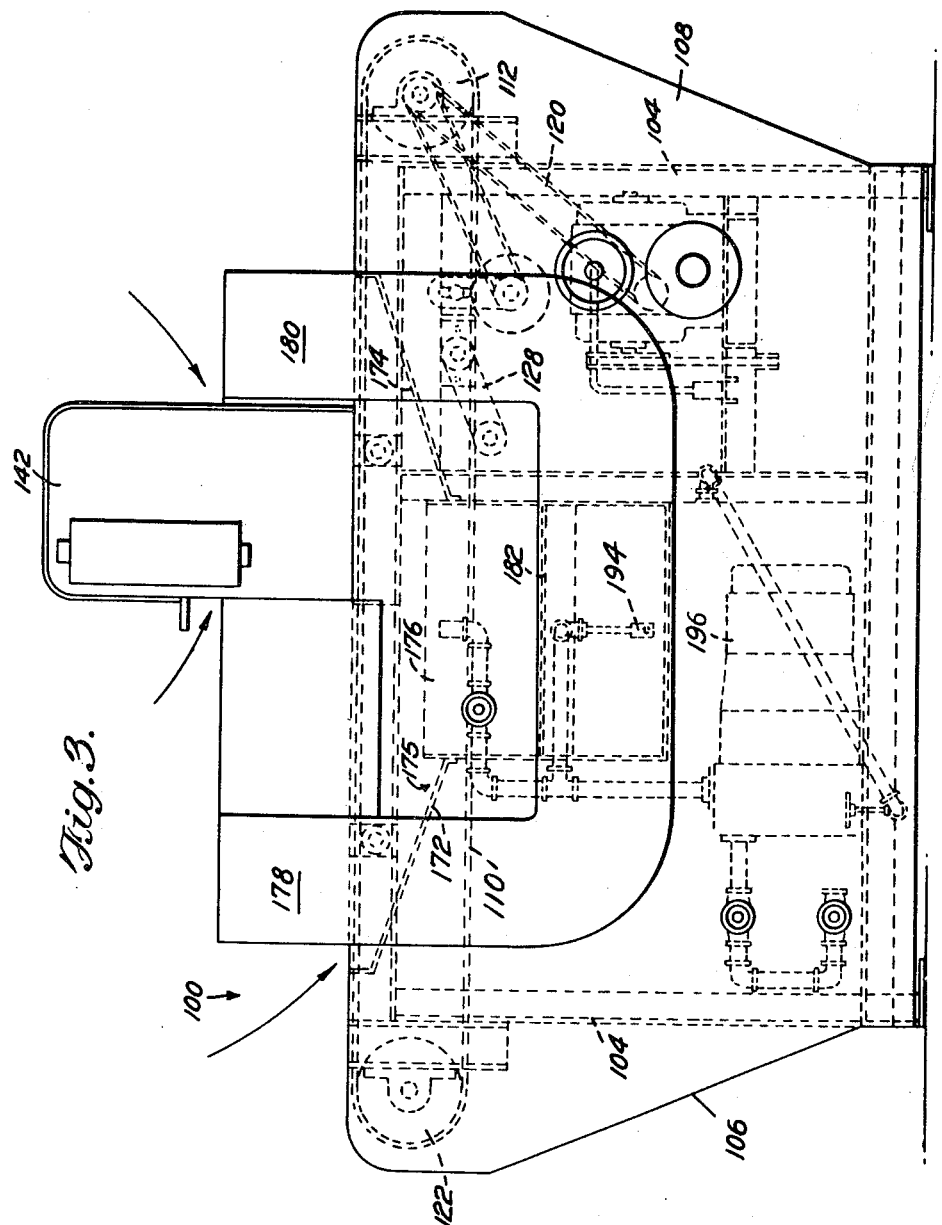
FIG. 2 is a schematic plan view schematically illustrating the apparatus shown in FIG. 1 and FIG. 1A in solid lines and other apparatus in dotted lines.
Figure 3:
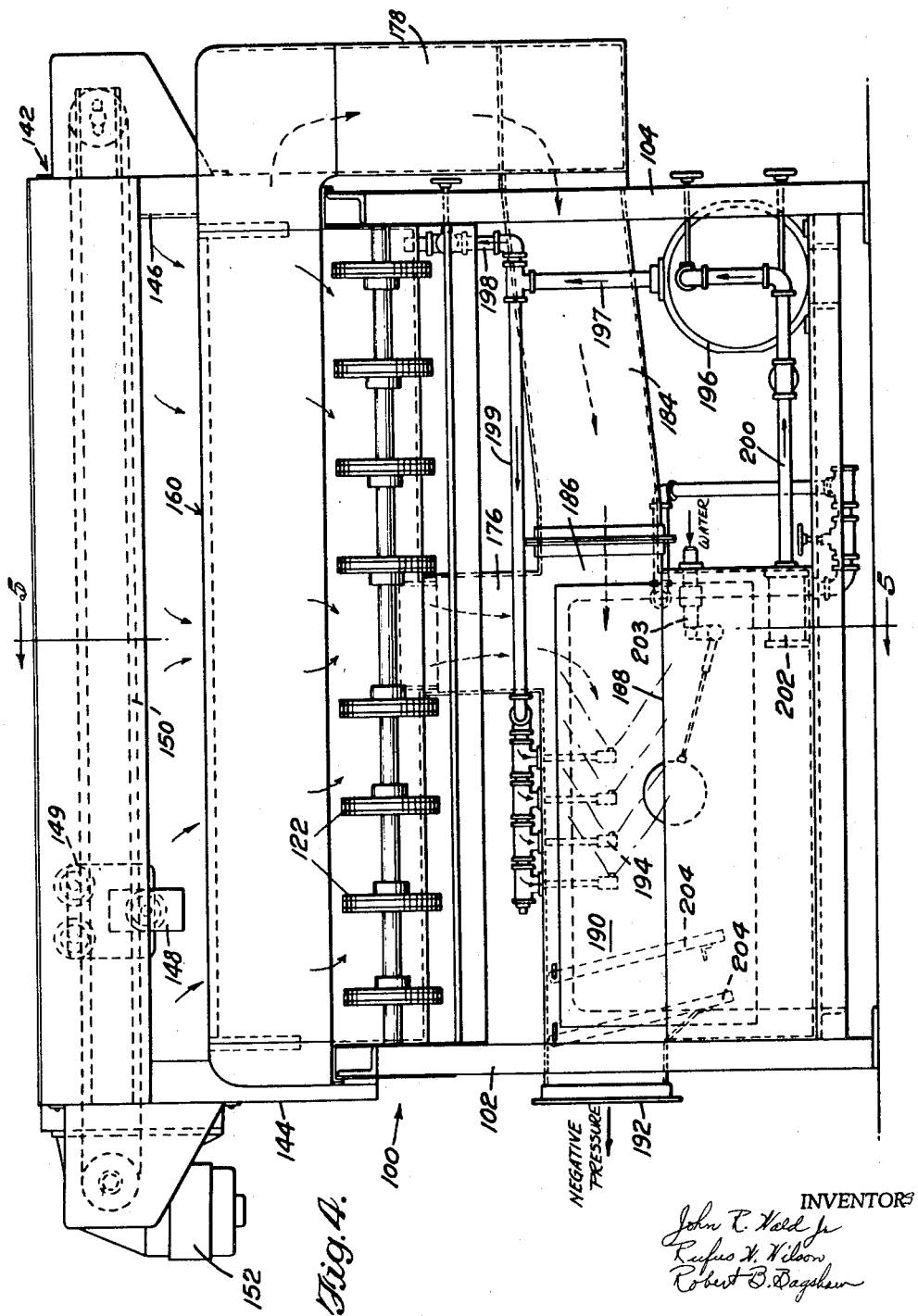
FIG. 3 is a view in side elevation of the automatic binder spray and down-draft separating stage of the apparatus in accordance with the invention.
Figure 4:
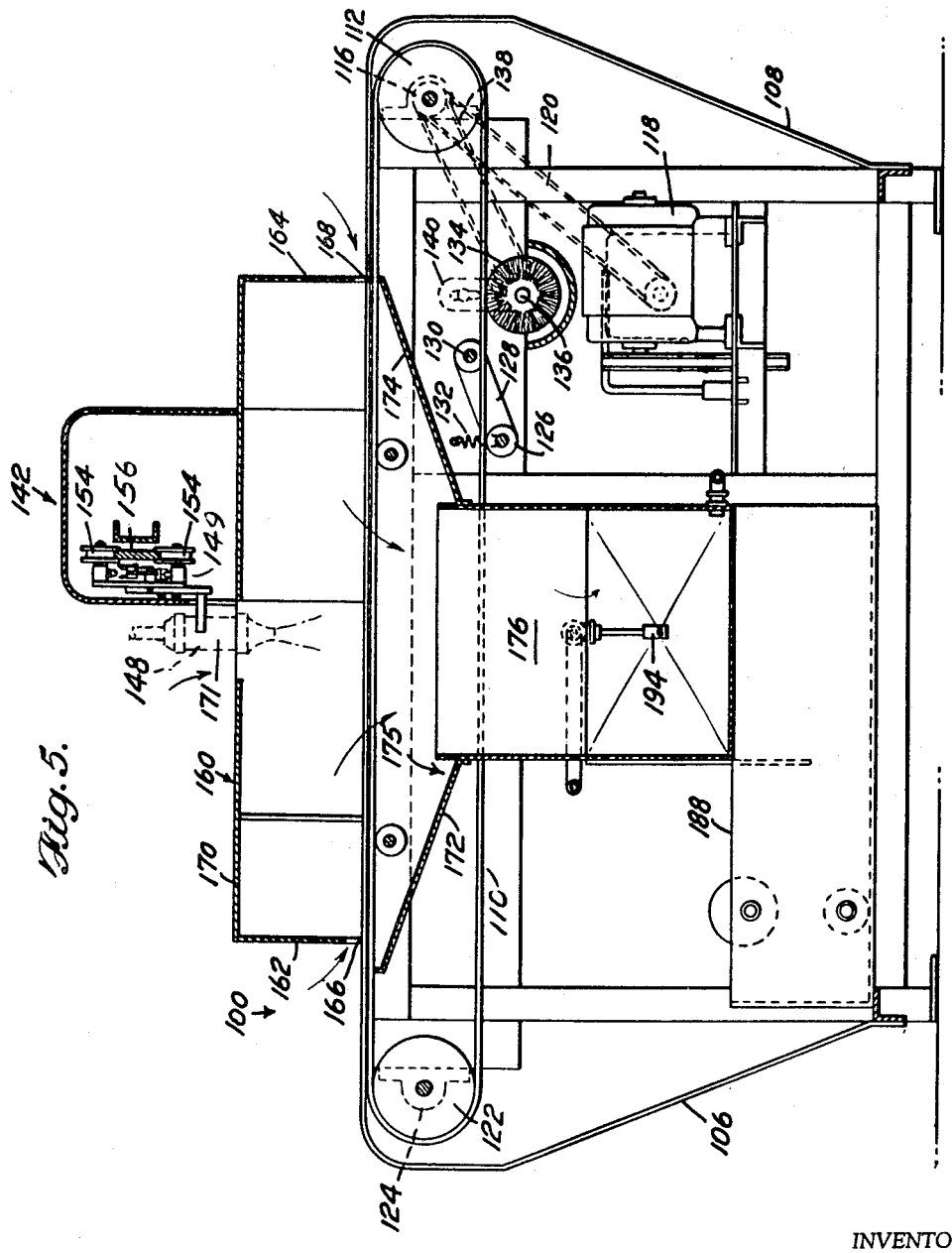
FIG. 4 is a view in end elevation of the apparatus shown in FIG. 3 looking at the apparatus from its feeding end.
Figure 13:
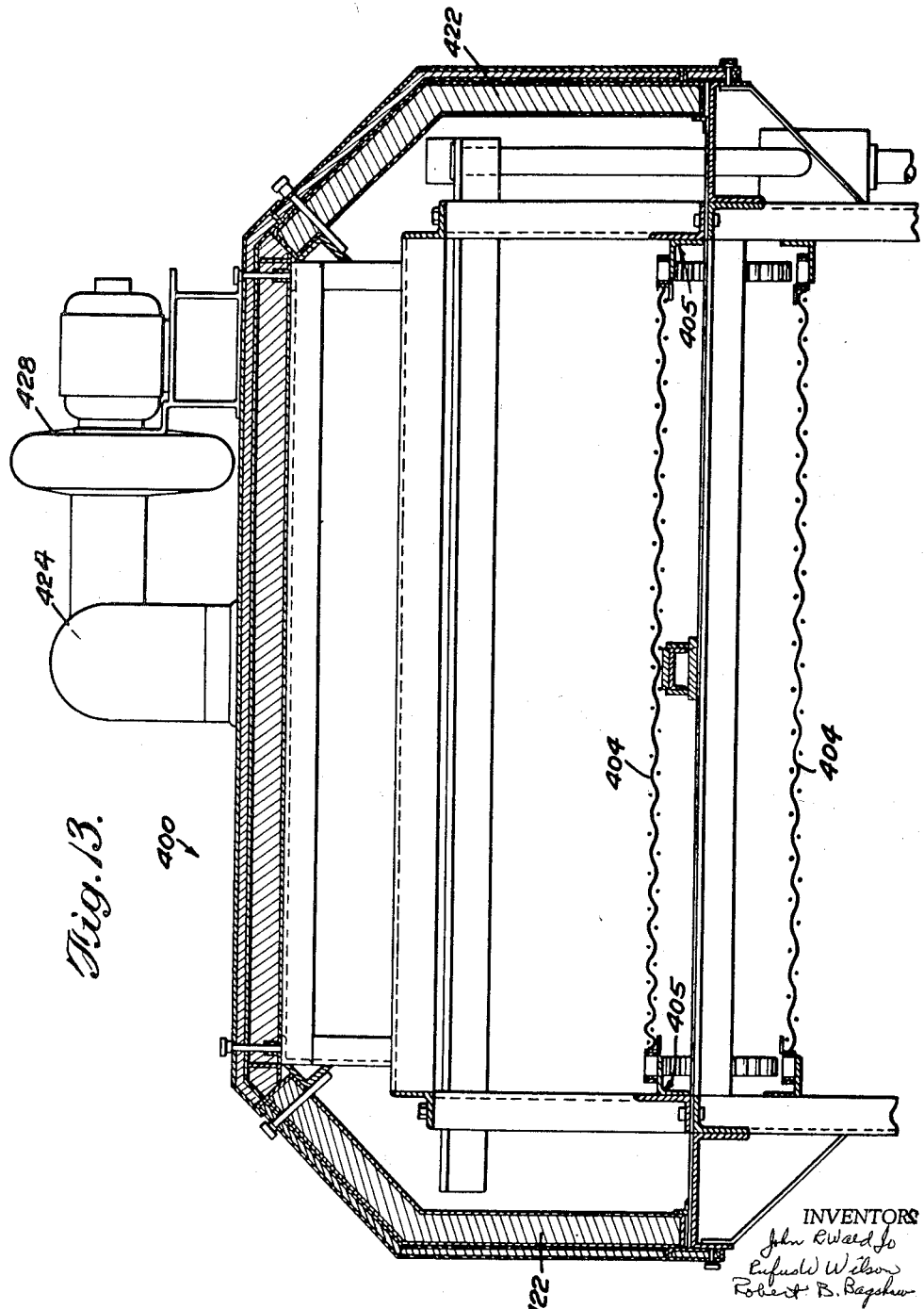

FIG. 8 and FIG. 8A, taken together, comprise a longitudinal vertical section through the zoned binder-baker stage;

FIG. 9 is a view in side elevation of the zoned binder-baker stage;

FIG. 10 is a view in elevation of a detail and FIGS. 11 and 12 are fragmentary similar views of details of the conveyor support members of the zoned binder-baker stage;

FIG. 13 is a transverse sectional view taken along the line 13—13 of FIG. 8 and looking in the direction of the arrows;

FIG. 14 is a view in side elevation of the high pressure after cooling stage;

FIG. 15 is a view similar to FIG. 14 taken from the opposite side;

FIG. 16 is a plan view of the high pressure after cooling stage;

FIG. 17 is a perspective view of a portion of the high pressure after cooling stage;

FIG. 18 is a longitudinal vertical section taken along the line 18—18 of FIG. 16 and looking in the direction of the arows;

FIG. 19 is a view in end elevation partially broken away of the high pressure after cooling stage and looking at it from its initial end;

FIG. 20 is a view in side elevation similar to FIG. 3 but of a modified form of automatic binder spray and down-draft mist separating stage; and FIG. 21 is a view in end elevation similar to FIG. 4 but of a modified form corresponding to the form shown in FIG. 20.

Referring to the drawings, the automatic sign reflectorizing apparatus comprises a production line P including an automatic binder spray and down-draft mist separating stage 100 for the spray application of binder to the sign that is to be treated, and for the removal of mist and excess unused binder as will be herienafter described, a controlled loader stage 300 comprising a bead dispensing apparatus which will also be hereinafter described, a zoned binder-baker stage 400 of which a detailed description will be hereinafter set forth, and a high-pressure after-cooling stage 500 for quickly bringing the finished product to handling temperature at the end of the production line.

Figure 5:
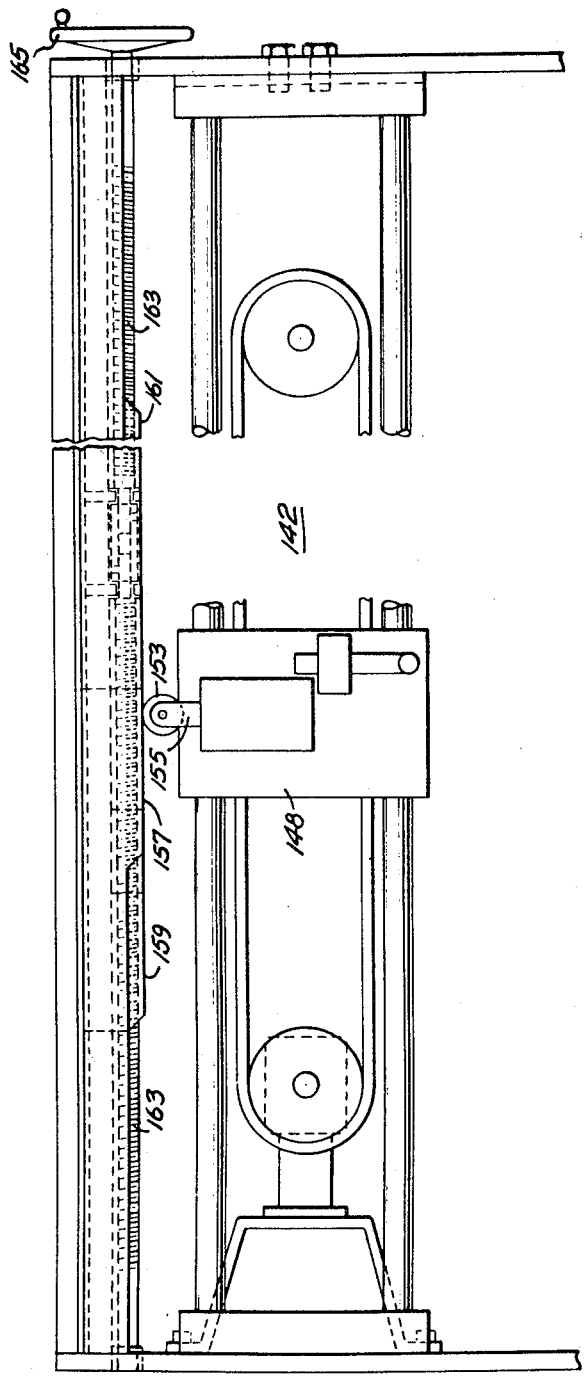
FIG. 5 is a view in longitudinal vertical section with parts shown in elevation taken along the line 5—5 FIG. 4, and looking in the direction of the arrows.

As shown in FIGS. 3, 4, and 5, the binder spray and mist separating stage 100 includes a housing structure having longitudinally extending side wall panels 102 and 104, respectively, and end wall panels 106 and 108, respectively. End wall 106 is disposed adjacent the inlet end of stage 100 while end wall 108 is disposed adjacent the discharge end of stage 100. A conveyor system is provided which includes a plurality of endless wire ropes 110 extending around sheaves 112 on a drive shaft 116 which is driven by a motor 118 through a chain drive 120, and around sheaves 122 on an idler shaft 124 supported adjacent the end panel 106 at the inlet end of stage 100.

In order to insure proper tension on the wire ropes 110 at all times, see FIG. 5, the lower run of each wire rope 110 passes over an idler pulley 126 mounted on a lever arm 128 secured to a take-up shaft 130 supported between the oppositely disposed side panels 102 and 104 of stage 100. A spring 132 supported by a horizontal bar (not shown) biases each idler pulley 126 into engagement with its respective wire rope 110 at all times to thereby insure an adequate tension on each of the individual wire ropes.

In order that the wire ropes 110 may be maintained in clean condition, a rotary rope cleaning device such as rotary wire brush member 134 is supported in engagement with the underneath run of each wire rope 110.

The plurality of rotary rope cleaning devices 134 are mounted on a shaft 136 which is rotatably driven by chain 138 from a sprocket mounted on drive shaft 116. The opposite ends of rope cleaner shaft 136 are supported by bracket members 140 which are vertically adjustable to permit adjustment of the position of the rope cleaning members 134 relative to the wire ropes 110.

A spray head assembly generally indicated at 142 is positioned above the walls 102–104–106–108 defining the cabinet structure of stage 100 and is supported intermediate the length of stage 100 by vertical bracket members 144–146 which are connected to the upper ends of the longitudinally extending walls 102 and 104. A traversing spray gun 148 carried by a carriage 149 is mounted on the spray head assembly and is reciprocated in a direction laterally of the path of travel of wire ropes 110 by an endless V-belt 150 driven by a motor 152. Stop members (not shown in the drawing) are provided at opposite ends of the reciprocating path of travel of spray gun 148 and when engaged by the spray gun carriage 149 actuate suitable mechanism on the spray gun carriage to cause the spray gun carriage to reverse its direction of movement by connecting itself in driving relation to an opposite run of V-belt 150. Spray gun carriage 149 includes sheaves 154 at its upper and lower ends which move along a guide track 156 rigidly mounted on the cabinet structure.

An important feature of the automatic binder spray and down-draft mist separating stage 100 is the provision of structure which traps or precipitates entrained mist containing binder which does not contact the work pieces. One important component of the down draft mist portion of stage 100 is the exhaust hood assembly generally indicated at 160 which is generally hollow box-like structure including laterally extending vertical walls 162 and 164, respectively (FIG. 5), facing the inlet and discharge ends, respectively, of stage 100, and including passages 166 and 168 through which the air is admitted and through which the work pieces carried by wire ropes 110 may pass.

In operation, carriage 149 and spray gun 148 make a complete stroke laterally of the conveyor on which the work pieces are supported, independently of the width of the work being processed. However, means are provided for adjusting the portion of the stroke in which the spray gun 148 operates to spray the binder on the work pieces.

As shown in FIG. 5A, the spray gun carriage carries at its upper end a roller 153 mounted on arm 155 which controls the opening of the spray gun valve. Arm 155 is spring-biased to a raised position in which the spray gun valve is closed. In order to control the opening of the spray gun valve by moving arm 155 downwardly against its spring bias, stationary cam means are provided directly above the path of movement of roller 153. The cam means includes a fixed cam 157 and two movable cam segments 159 and 161. The length of fixed cam 157 laterally of the conveyor corresponds to the minimum width of spray desired. Movable cam segments 159 and 161 are in threaded engagement with a shaft 163 which is suitably supported by the spray head assembly 142. The respective cam segments 159 and 161 are threaded with opposite-handed threads so as to cause the two cam segments to move in opposite directions when shaft 163 is turned. Shaft 163 is turned by means of handwheel 165 to either retract cam segments 159 and 161 to a position in which they lie behind fixed cam 157, or to a position in which they extend beyond the opposite ends of fixed cam 157 to any desired extent. The combined effective lateral width of fixed cam 157 and the two adjustable cam segments 159 and 161 determine the length of the spraying stroke since engagement of roller 153 with any of the cams 157, 159, 161 is effective to open the valve of the spray gun.

Vertical walls 162 and 164 are joined at their upper ends by a horizontal wall 170 containing a passage 171 through which the nozzle of the spray gun projects and through which air is also admitted. Walls 162, 164 and 170 of the exhaust hood assembly all lie above the plane of movement of the upper run of wire ropes 110. The lower portion of the exhaust hood is defined by downwardly inclined walls 172 and 174 which are connected to the upper end of a vertically extending exhaust duct 176 best seen in FIGS. 4 and 4. Walls 172 and 174 are suitably joined together by longitudinally extending side wall portions.

The downwardly inclined walls 172 and 174 and the connecting side wall portions therebetween form a tray generally indicated at 175 through which water is continuously circulated by a high pressure pump 196 as will be hereinafter more fully described. Pump 196 has a discharge line 197 having a branch discharge line 198 which is connected to water tray 175. The water from tray 175 spills over into vertical duct 176 from which it passes to a sump tank to be hereinafter described.

A substantial proportion of the binder mist which does not contact the workpieces is trapped in the water bath of tray 175.

On one side of the exhaust hood, the vertical end walls 162 and 164 are joined by a suitable longitudinally extending side wall to form a closure between these two end walls while on the opposite side of the exhaust housing adjacent longitudinal wall 164 of stage 100, two external vertical ducts 178 and 180 (FIG. 3) provide air communication between the opposite ends of the upper portion of the exhaust hood 160 and internal vertical duct 176. The two external vertical ducts 178 and 180 are joined together at their lower ends by a longitudinally extending duct portion 182 which, in turn, is connected to the lower end of internal vertical duct 176 by a laterally extending duct 184 which extends interiorly of the cabinet structure. The lower end of internal vertical duct 176 and the inner end of lateral duct 184 are connected to a duct 186 which forms a continuation of duct 184. Duct 186 defines a spray chamber in which binder mist is precipitated from the exhaust air as will be more fully described. Duct 186 is open on its underneath surface so as to communicate with a sump tank 188 positioned below it. Duct 186 is also open on its side, this opening being normally closed by a removable panel 190.

A source of negative air pressure is applied to the exhaust hood system at the outlet 192 of the spray chamber formed by duct 186. Thus, air passing into the upper level of exhaust hood 160 through the inlet passages 166, 168 and 171 is directed downwardly by the bottom walls 172 and 174 at the lower end of exhaust hood into the upper end of internal vertical duct 176 and thence passes to duct 186. Another passage for the air from exhaust hood 160 is provided by the vertical ducts 178 and 180 which communicate through duct portions 182 and 184 with spray chamber duct 186. The exhaust air coming through the ducts 176 and 184 all converge together into the spraying chamber defined by duct 186.

Supplementing the washing action of the water in water tray 175 and to remove from the exhaust air any entrained binder material in mist form not removed by the action of water tray 175 before the exhaust air escapes to the atmosphere, an air washing apparatus is provided as hereinafter described. A plurality of spray pipes 194 which are connected through conduit 199 to the discharge line 197 of high pressure pump 196 provide a water spray. Pump 196 also supplies water to water tray 175 as previously explained. Spray pipes 194 extend downwardly through the upper surface of duct 186 to the interior thereof directly into the path of exhaust air coming from ducts 176 and 184. The water discharged from spray pipes 194 falls into sump tank 188 which is positioned beneath the elongated opening in the lower wall of duct 186. Sump tank 188 is connected at its lower end through a suitable filter 202 to the inlet line 200 of pump 196. Thus, the high pressure pump 196 provides a continuous circulation of water to spray pipes 194, the water passing to sump tank 188 and back to pump 194 through inlet pipe 200. The water in sump tank 188 is maintained at a predetermined level by a float operated valve 203 which controls admission of water to the circulating system to compensate for losses due to evaporation.

To additionally assist in the precipitation of binder material from the exhaust mist, baffles 204 are positioned in the path of exhaust air through duct 186. Baffles 204 extend from the upper end of duct 186 to beneath the normal water level in sump tank 188 and provide an obstruction in the path of air flow through duct 186 beyond water spray pipes 194 which causes the air to pass through the water in sump tank 188 before escaping to the outlet end 192 of duct 186. Thus, the down draft air passing through exhaust hood 160 passes into contact with the water in water tray 175, then is washed by the water from spray pipes 194, and is finally washed by passage through the water in sump tank 188 in the region of baffles 204. The air which finally passes through outlet opening 192 has had substantially all of the entrained binder material separated therefrom and passes into the atmosphere surrounding the apparatus in a clean condition.

The location of the water tray and spray entirely within the first stage is critical insofar as space saving is concerned and also with respect to the substantial elimination of maintenance problems and fire hazards.

Figure 6:
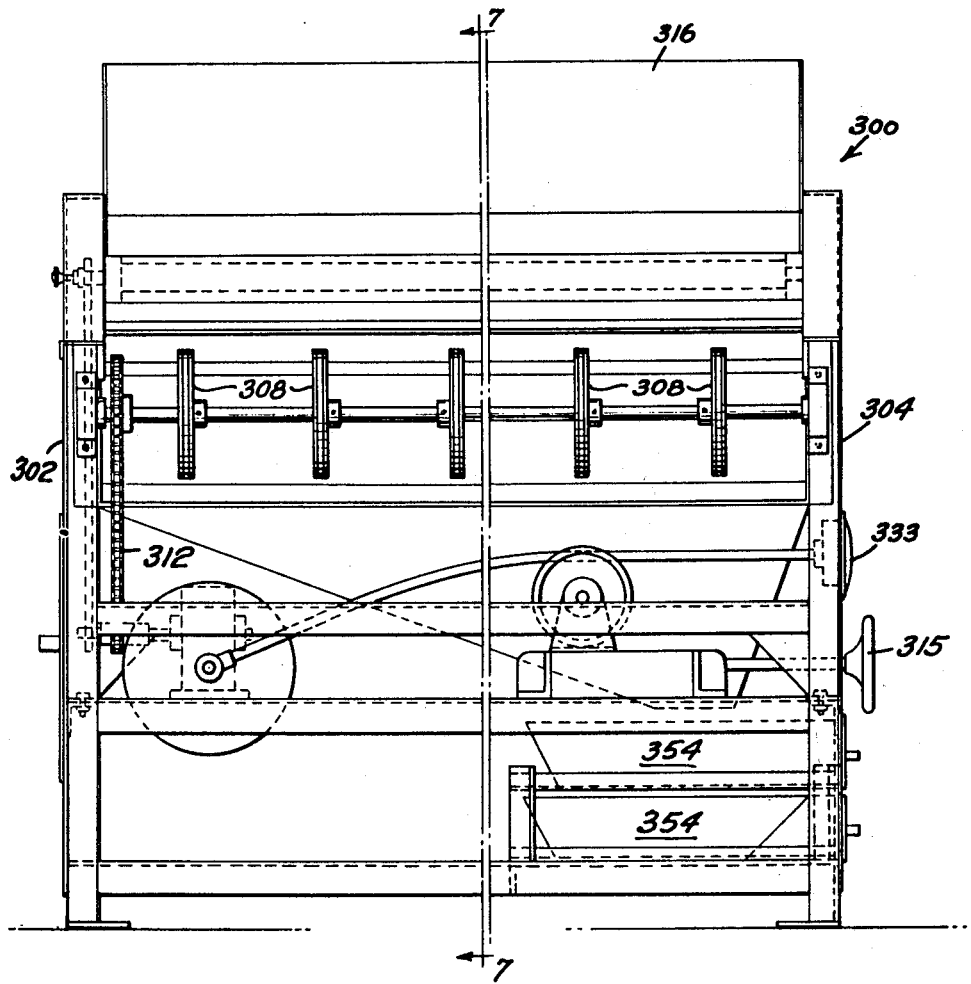
FIG. 6 is a view in end elevation of the controlled loader stage which includes the bead dispensing apparatus.

The controlled loader stage 300 is best seen in FIGS. 6 and 7 and includes a cabinet structure positioned in alignment with the cabinet structure of the automatic binder spray and down-draft mist separating stage 100. The cabinet structure of loading stage 300 includes longitudinally extending side panels 302 and 304 which are connected together by suitable cross members. A conveyor system generally indicated at 306 is provided for moving the workpieces through the loading stage, the conveyor being formed of a plurality of laterally spaced wire ropes similar to those used in the spraying stage 100 and passing around sheaves 308 adjacent the input end of the loader stage and around sheaves 310 adjacent the discharge end of the loader stage. Sheaves 308 are connected by a chain drive 312 to the output shaft of a motor driven variable speed drive system 314 whose speed may be controlled by adjusting the handwheel 315 shown in FIG. 6.

In order to provide proper tension on the wire ropes of conveyor 306, a tensioning device generally indicated at 317 is provided which is generally similar to the tensioning device used in stage 100 and will not be described in detail again.

Positioned above the path of movement of the conveyor 306 and substantially intermediate the longitudinal length of stage 300 is a dispenser assembly generally indicated at 316, including a hopper member 318 which is supported above the plane of conveyor 306 by support members 320. Supporting structure 320 includes panel members which completely enclose the space beneath the hopper 318 in order to provide a chamber 322 which is closed to the atmosphere around the sides thereof. Hopper 318 is bounded on its lower portion by inclined walls 324 and 326 which terminate at a dispensing chamber generally indicated at 328 mounted below the bottom walls of the hopper. Positioned within the dispensing chamber 328 is a roller member 330 which is driven by a chain or other suitable power driven connection 322 from the output of the variable speed drive system 314 which also drives conveyor 306. Roller 330 has a surface which is knurled in such manner as to provide a multiplicity of small pockets into which the glass bead reflectorizing elements fall as they emerge from the dispensing hopper 318.

A suitable tachometer device 333 is connected to the variable speed drive system to indicate the speed of movement thereof.

As shown in FIG. 7A, the inclined bottom walls 324 and 326 of hopper 318 terminate in flat horizontal portions 329 and 331, respectively, having a space between their facing edges through which the reflectorizing material, such as glass spheres, for example, may pass. A deflecting member having an inclined surface 332 extends downwardly beneath the space between edges 329 and 331 of hopper 318 and a felt member 334 secured between guides 336 and 338 bears with a wiping action against the surface of roller member 330 in dispensing chamber 328. The contact of felt member 334 may be adjusted with respect to rotary shaft 330 by means of an adjusting screw which tightens a bar member 342 against the surface of felt member 334, to thereby urge the felt member against the surface of roller 330. Due to the provision of the inclined deflector 332 and the felt member 334, the reflectorizing material, such as glass spheres, which pass downwardly from the discharge end of hopper 318 fall into the space between the inclined deflector 332 and the felt 334 and into the minute pockets of roller 330, felt 334 tending to wipe the glass spheres into the pockets of the roller.

The lower end of dispensing chamber 328 is defined by a rearwardly inclined front plate member 344 and by a forwardly inclined rear plate member 346 having their adjacent surfaces spaced from each other to form a narrow outlet passage 348. Positioned interiorly of dispensing chamber 328 and below the rotating dispensing shaft 330 is a forwardly inclined deflector member 350 whose forward edge is disposed a short distance from the inside surface of front deflector plate 344 to define a narrow passage between front deflector plate 344 and bottom deflector 350. Roller 330 and felt 334 and the deflector members 344, 346 and 350 all extend laterally for substantially the entire width of the conveyor.

As dispensing roller 330 is rotated in a clockwise direction with respect to the view shown in FIG. 7, the glass bead reflectorizing elements picked up by roller 330 drop first onto the inclined deflector surface 350. The beads roll down the surface of deflector 350 and drop onto the rearwardly inclined deflector plate 344. The beads roll down the inclined surface of front deflector plate 344 and drop onto the inclined surface of forwardly inclined deflector plate 346. The beads roll down the inclined surface of deflector plate 346 and drop onto the surface of the workpieces there. They adhere to the binder coating applied at stage 100.

Due to the provision of the deflecting system just described, the reflectorizing material is evenly distributed over the lateral width of the conveyor so as to be evenly distributed on the workpieces as they pass beneath the dispensing hopper. Furthermore, the deflection system, together with the closure formed by walls 320 beneath the hopper, tends to exclude moist air from coming in contact with the glass beads, thereby helping to maintain the beads in a dry condition which improves the adhesive bond between the beads and the binder to which they are applied.

In order to catch any excess reflectorizing material which does not adhere to the workpieces, a return hopper generally indicated at 352 is positioned beneath conveyor 306 and beneath the dispensing hopper 318 to catch any excess reflectorizing material and direct it toward a suitable receptacle 354. Receptacle 354 may be in the form of a slidable tray which may be removed from the cabinet structure for emptying. Return hopper 352 includes inclined wall portions which converge downwardly toward a discharge opening 356 disposed above the receiving receptacle or tray 354.

From the loading station 300, as shown in FIGS. 8, 8A and 9, the metal workpieces such as license plates or road signs pass to the zoned binder-baker stage generally indicated at 400 which supports a wire mesh conveyor 404 for movement, whereby the workpieces are carried through the heating ovens to be described. Conveyor 404 is connected on either of its sides to drive chains which extend around an idler sprocket 406 at the loading end of stage 400 and around a driven sprocket 408 at the unloading or discharge end of stage 400. The conveyor is suitably supported along its lateral edges for substantially the entire length of the upper run thereof by angle members generally indicated at 405 each including a vertical web portion 407 and a horizontal flange portion 409. The ends of the flange portions 409 are curved downwardly in an arc as indicated at 411 to provide a smoother movement of the conveyor past the end of the flange portion.

Angle member supports 405 are provided for the lateral edges of the conveyor along only a portion of the lower run of the conveyor, the conveyor being unsupported on its lower run for a substantial portion of its length adjacent drive sprocket 408. This causes the conveyor to sag downwardly as best seen in the view of FIG. 8A, to thereby place a tension on the upper run of the conveyor which maintains the upper run under suitable tension at all times.

The binder-baker stage 400 includes a plurality of connected oven sections such as those indicated at 410, 412, 414, 416, 418 and 420, respectively. Each of these oven units occupies substantially the same space lengthwise of the oven assembly. The top and side walls of the oven units are well insulated with an insulating material 422, as best seen in the views of FIGS. 8 and 13.

In the first oven unit 410 are positioned a number of closely spaced radiant heater elements on closely spaced centers to quickly dry the applied binder. For example, oven unit 410 may contain nine radiant heater elements spaced on six-inch centers. The binder liquid applied at stage 100 of the apparatus includes not only pigment and solvent, but also resin of the thermosetting type, such as phenol formaldehyde. The resin at stage 100 is in the "A" phase and the binder at this stage is sprayed to a controlled thickness which is permitted to level out on its way to the loader stage 300, where the glass sphere or other reflectorizing material is applied. After the reflectorizing material is applied, the binder is quickly passed through the "B" phase in the first zone of the baker stage, namely, in the zone of oven unit 410. Oven units 412 and 414 each contain three radiant heater elements on 16-inch centers, for a total of six elements, thereby defining a second heating zone. The third heating zone is defined by the radiant heater elements of oven units 416, 418 and 420, each of these oven units having three heater elements on 20-inch–22-inch centers for a total of nine elements. The binder material is carried through the "C" phase in the second and third zones of the baker stage, defined by oven units 412, 414, 416, 418 and 420.

An exhaust duct system is connected to the oven tunnel and includes duct sections 424 and 426 which are respectively connected to the interior of oven units 412 and 418. An exhaust fan 428 is connected to duct sections 424 and 426 at their junction with each other, the exhaust fan drawing the exhaust air and gases outwardly through the two exhaust ducts and exhausting to atmosphere or to some external exhaust point.

The after-cooler stage 500 is placed sequentially immediately after the last unit of the oven tunnel and includes a cabinet structure 502 positioned in alignment with the cabinet structure of the binder-baker stage 400 and which supports a separately driven conveyor 504. Conveyor 504 includes a plurality of wire rope cables such as those described in connection with spraying stage 100 which pass around a plurality of idler sheaves 505 at the loading end of the after-cooler stage, and around a plurality of drive sheaves 506 at the discharge end of the after cooler stage. Conveyor 504 is driven by a motor 508 through a chain drive 510. A high pressure cooling duct system is provided at cooling stage 500, including a pair of vertical ducts 512 and 514 disposed on opposite sides of the cabinet structure 502 and connected to each other by a laterally extending separate top wall duct portion 516 having laterally extending side wall duct portions which are spaced above the plane of the path of movement of conveyor 504 sufficiently to allow the conveyor and the workpieces thereon to pass through the cooling stage.

As best seen in the view of FIG. 19, a blower 522 which has its inlet end connected to atmosphere through inlet 524 (FIG. 14) blows high pressure air upwardly through vertical duct 512 and laterally across the horizontal duct portion 516. The high pressure air then passes downwardly through the oppositely disposed vertical duct portion 514. The motion of the air downwardly through duct 514 is assisted by a suction fan 526 which discharges to atmosphere through the duct outlet 528. Thus, a continuous circulation of high pressure air passes through the duct system 512, 514 and 516 to produce a cooling effect upon the workpieces being carried through high pressure cooling stage 500 by the conveyor. The high pressure cooling system provided by stage 500 always maintains the air pressure above the work above atmospheric and no air is sucked from below the work so as to interfere with the rapid cooling of the workpieces.

After the work passes through the after-cooling stage 500, it is sufficiently cool to be manually handled, and it may be interleaved with tissue or waxed paper or other suitable separators and packed for shipment.

As shown in FIGS. 20 and 21, a modified spraying and down draft mist separating stage, generally indicated at 600, includes a cabinet structure which supports a moving conveyor 602 which carries the workpieces through the spraying stage. Conveyor 602 is of somewhat modified construction from that used in spraying stage 100 previously described and includes on either side thereof a pair of longitudinally extending chains 608 and 610 which pass around idler sprockets 604 at the input or loading end of the stage, and around drive sprockets 606 at the delivery end of the stage. Conveyor 602 includes a plurality of laterally extending cross strip members such as those indicated at 612 and which extend between the oppositely disposed chains 608 and 610 of the conveyor. Each of the cross strip members 612 carries thereon a plurality of spike-like members 614 which support the workpieces. The conveyor passes around drums such as those indicated at 616 at opposite ends of the conveyor. In order to maintain the spike members clean, rotary brush members 618 corresponding to each of the rows of spike members are driven by a suitable power take-off from the main drive motor which drives the conveyor.

A spray head assembly generally indicated at 620 is positioned above the cabinet structure and above the path of conveyor 602 and is substantially similar to the spray head assembly described in connection with the spraying stage 100.

An exhaust hood assembly 622 is positioned above the path of travel of conveyor 602 and extends for the entire lateral width of the conveyor both forwardly and rearwardly of the spray head assembly. The exhaust hood 622 is provided with openings which permit the conveyor and the workpieces supported thereon to pass through the exhaust hood and beneath the spray head assembly, but otherwise the exhaust hood substantially completely encloses the space above the path of the conveyor for a substantial distance from the spray head assembly toward the input end of the stage and for a somewhat shorter distance from the spray head assembly toward the output end of the stage. At each end of the exhaust hood 622 on one lateral side thereof are connected vertical ducts 624 and 626, respectively, which communicate with the interior of the exhaust hood adjacent the input and output ends, respectively, of the exhaust hood, with reference to the direction of movement of the conveyor and of the workpieces supported thereon.

Vertical ducts 624 and 626 are connected to each other at their lower ends by a cross duct portion 628 and a laterally extending duct member 630 communicates with duct portion 628 intermediate the length thereof and substantially centrally of the length of stage 600. Duct 630 extends into communication with a spraying chamber defined by a duct 632 connected to a source of negative pressure at its outer end 634. Duct 632 has a side opening which is covered by a removable panel 636, and is also open on its underneath surface to communicate with a sump tank 638 positioned beneath duct 632.

Spray pipes 640 extend downwardly into the interior of duct 632 and spray the air passing through the duct in such manner as to precipitate any pigments or binder material into sump tank 638. Baffle members are positioned in the path of the mist-laden air in such manner as to force the air downwardly through the water bath in sump tank 638 before it passes outwardly through the outlet opening 634 of duct 632 to the source of negative pressure. A high pressure pump 644 supplies water to spray pipes 640 through discharge pipe 646 of the pump.

To additionally aid in the precipitation of the unused binder mist from the air, a water pan 648 is positioned between the upper and lower runs of conveyor 602, water pan 648 extending longitudinally of the conveyor for substantially the entire distance between idler sprocket 604 and drive sprocket 606 and extending laterally of the conveyor for the entire width thereof. Water pan 648 is continuously supplied with water through pipe 650 which is connected to discharge pipe 646 of pump 644. A suitable drain connection is provided between water pan 648 and sump tank 638.

Summary of operation

The operation of the embodiment of FIGS. 1–19 is hereinafter described. The metal workpieces, such as license plates or signs, which are to be coated with a reflectorizing material, are positioned on the wire ropes 110 which form the conveyor of spraying and down draft mist separating stage 100. The workpieces are moved by wire ropes 110 through passage 166 of exhaust hood 160. Spray gun 148 projects downwardly into the interior of the exhaust hood above the surface of the workpieces and is traversed in a lateral direction by motor driven belt 150 to spray a suitable binder liquid to a controlled thickness onto the surface of the workpieces. The binder liquid includes not only pigment and solvent but also a resin of the thermosetting type such as phenol formaldehyde. The resin in the binder liquid is in the "A" phase at stage 100.

A down draft is provided through exhaust hood 160 to cause any unused binder mist to be drawn downwardly through the centrally located vertical exhaust duct 176 at the lower end of the exhaust and through the external vertical exhaust ducts 178 and 180 into communication with duct 186 which defines the spraying chamber. The portion of the exhaust air passing into vertical exhaust duct 176 also passes into proximity to the water in water pan 175 defined by the sloping bottom walls 172 and 174 of exhaust hood 160. All of the exhaust air, including that which passes through external vertical exhaust ducts 178 and 180 and also the air which passes through internal vertical duct 176 passes through the spray chamber formed by duct 186. Water from spray pipes 194 sprays the mist-laden air passing through duct 186 to precipitate binder mist into sump tank 188. The washed air passing spray pipes 194 must also pass downwardly through the water in sump tank 188 in order to get around baffle members 204. Thus, some of the down draft air is subject to the precipitating action of the water in water pan 175 to aid in removing binder mist from the air, while all of the exhaust air must pass by the water spray pipes 194 and pass the baffles 204 before emerging from outlet end 192 of duct 186. The air which emerges from outlet end 192 has been subjected to a thorough cleaning action and substantially all of the entrained binder material has been removed therefrom so that the air as it is discharged in the vicinity of the reflectorizing apparatus does not clog or adhere as a coating on portions of the apparatus in such manner as to adversely affect the operation of the apparatus.

After the workpieces have passed through the outlet passage 168 of exhaust hood 160, they are picked up by conveyor 306 of loading stage 300 and are carried by conveyor 306 beneath hopper 316 where dispensing roller 330 dispenses a measured quantity of glass bead reflectorizing elements or other suitable reflectorizing elements onto the binder coated surface of the metal workpieces. Loading station 300 is positioned in close juxtaposition to the spraying and down draft mist separating stage 100 so that the resinous binder coating is still in the "A" phase when it reaches loading stage 300, causing the glass bead reflectorizing elements dispensed by hopper 316 to become adhesively attached to the binder coating. The arrangement of baffle members 344, 346 and 350 beneath head dispensing roller 330 insures that the glass bead reflectorizing elements are evenly distributed across the lateral width of the workpieces. Any excess reflectorizing elements which do not adhere to the workpieces are caught in the return hopper 352 positioned beneath conveyor 306 and are delivered by return hopper 352 to the receptacle 354 from which the reflectorizing elements may be removed for re-use.

After the workpieces have passed beneath hopper 316 and have received a coating of reflectorizing elements, they are delivered by conveyor 306 to conveyor 404 of the binder-baker stage 400. Conveyor 404 carries the workpieces, now coated with the binder material and with the glass bead reflectorizing elements, into the first oven unit 410 of the binder-baker stage which has positioned therein a number of closely spaced radiant heater elements which quickly heat the binder coating and cause the thermosetting material of the binder coating, such as phenol formaldehyde, to quickly pass through the "B" phase. For example, oven unit 410 may have nine radiant heater elements spaced apart on six-inch centers. Conveyor 404 then passes the workpieces through the second zone of the binder-baker stage defined by oven units 412 and 414 which may each have, for example, three radiant heating elements positioned on sixteen-inch centers, for a total of six heating elements in the second zone, and then through the third heating zone defined by oven units 416, 418 and 420 which may each have three heating elements on twenty-inch–twenty-two-inch centers for a total of nine elements in the third zone. The resinous binder material is carried through the "C" phase in the second and third zones of the baker stage defined by oven units 412, 414, 416, 418 and 420.

The division of the oven units into heat zones, as described, permits the resinous binder coating to be quickly heated sufficiently to pass it rapidly through the "B" phase and then more slowly heated to pass it through the "C" phase. The graduated distribution of the radiant heat, including the high concentration at the beginning of the path of movement, with successively lower heat concentrations as the movement of the workpieces through the oven progresses, permits curing of the resinous coating in a minimum overall longitudinal length of oven.

After emerging from the last oven unit 420, the metal workpieces with the resinous coating thereon in a cured condition, are now pased onto the conveyor 504 of the after-cooler stage 500, where the hot metal workpieces are quickly cooled to a temperature at which they may be manually handled.

The workpieces moving through the high pressure after-cooler stage 500 are subjected to high pressure cooling air which is moved laterally across the upper face of the workpieces by a blower 522 which blows the high pressure air upwardly through vertical duct 512 and laterally across the horizontal duct portion 516 where it comes into contact with the upper face of the workpieces. The high pressure air is then drawn downwardly through vertical duct 514 by a suction fan 526. Thus, blower 522 and suction fan 526 cooperate to provide a continuous circulation of high pressure air through vertical duct 512, across horizontal duct 516 and downwardly through vertical duct 514 to produce a cooling effect upon the workpieces being carried through high pressure cooler stage 500 by the conveyor associated with that stage.

The operation of the modified spraying and down draft mist separating station shown in FIGS. 20 and 21 is generally similar to that described in connection with that of the similar stage 100 of the embodiment of FIGS. 1–19, inclusive. In the modified embodiment of FIGS. 20 and 21, the metal workpieces are carried by a conveyor 602 beneath an exhaust hood 622 where a traversing spray gun assembly 620 sprays a controlled amount of resinous binder material onto the upper face of the workpieces. The mist-laden air is removed from the exhaust hood 622 through vertical ducts 624 and 626 which connect with each other through duct 628, the exhaust air then passing through lateral duct 630 into communication with duct 632 which defines the spraying chamber. The exhaust air pasing into duct 632 is sprayed by water spray pipes 640 and is also passed through the water sump tank 638 due to the action of the deflector elements 642 in a manner generally similar to that described in connection with the embodiment of FIGS. 1–19. The mist-laden air beneath the exhaust hood 622 of the embodiment of FIGS. 20–21 is also subjected to the precipitating action of a water pan 648 positioned between the upper and lower runs of conveyor 602. Unlike the embodiment of FIGS. 1–19, the embodiment of FIGS. 20–21 does not include a centrally located vertical duct such as duct 176 shown in FIG. 5 through which exhaust air may pass to the spraying chamber. Instead, all of the exhaust air must pass to the spraying chamber through the vertical ducts 624 and 626 and the ducts 628 and 630 to which these vertical ducts are connected and no internal centrally located vertical duct corresponding to duct 176 shown in FIG. 5 is provided in this modified embodiment.

It can be seen from the foregoing that there is provided in accordance with this invention a coordinated and integrated sign reflectorizing apparatus occupying a minimum longitudinal space and including in cooperative relation an automatic binder spray and down draft mist separating stage, a controlled loader stage for dispensing the reflectorizing material, a zoned binder-baker stage, and a high pressure after-cooling stage. The apparatus of the invention permits metal workpieces such as signs, license plates and the like to be reflectorized at a low first cost and at a low operational cost, providing at the same time a superior product having a controlled binder coating thickness and a controlled distribution of reflectorizing elements embedded in the binder coating.

The apparatus of the invention includes a spraying stage and down draft mist separating stage so constructed as to precipitate any unused binder material from the air within the spraying stage, to thereby prevent the unused binder material from clogging and coating portions of the reflectorizing apparatus so as to interfere with the proper operation of the apparatus. Furthermore, the loading stage of the apparatus is so constructed as to prevent substantial accumulation of moisture on the reflectorizing material being coated at the dispensing station, thereby improving the bond between the reflectorizing material being loaded and the binder on the metal surface of the workpiece.

The binder-baker oven stage of the apparatus cooperates with the remainder of the apparatus to provide a zoned heat distribution in which the resinous binder coating is first quickly heated to pass it through the "B" phase and then more gradually heated to pass it through the "C" phase. The zoned distribution of the heating units in the binder-baker oven permits the resinous coating on the workpieces to be cured in an oven of less longitudinal length than in ovens of the prior art, thereby reducing the overall length of the apparatus and reducing the space allocation of the oven and of the apparatus.

A further advantage of the apparatus is the provision of separate conveyors in the various stages of the apparatus, to thereby prevent an accumulation of binder material from the spraying stage being carried through the baking stage where it would cause a build-up on the conveyor of foreign material which would soon cause a shutdown of the equipment.

The high pressure after-cooling stage of the apparatus cooperates with the remainder of the apparatus to quickly cool the workpieces to a temperature at which they can be manually handled and to permit the workpieces to be interleaved with tissue, wax paper or other suitable separators and packed for shipment.

It will be obvious to those skilled in the art that various changes may be made without departing from the spirit of the invention and therefore the invention is not limited to what is shown in the drawings and described in the specification but only as indicated in the appended claims.

What is claimed is:

1. In an automatic sign baking machine, a continuous production apparatus including an automatic binder spray and down-draft mist separating stage, a controlled loader stage, a successively decreasing temperature zoned binder-baker stage, and a high pressure after-cooling stage, a first conveying means for conveying work to be processed through said first two stages, a second conveying means for conveying said work through said second two stages whereby excess binder will not be passed through said binder-baker stage, thereby permitting the apparatus to operate continuously.

2. An automatic sign baking machine in accordance with claim 1, wherein said binder spray and down-draft mist separating stage comprises a spray generating element located above the work to be treated, a water tray located below the work to be treated, means for keeping said water tray covered with water whereby any excess binder will be received by the water in said tray, an opening in said water tray through which air may pass to a space below said tray, means for creating a negative pressure about said spray generating element and in the space below said tray so as to cause a down-draft of the mist about said spray, and means for washing said mist including a water spray located below said water tray.

3. An automatic sign baking machine in accordance with claim 1, wherein said controlled loader stage includes a glass sphere dispenser comprising a knurled rotor and an envelope therefor including a guide spout whereby said glass spheres may be confined and protected from moisture in the atmosphere during the feeding and loading operation.

4. An automatic sign baking machine in accordance with claim 1, wherein said binder-baker stage is divided into three zones, a predetermined number of radiant heating elements located in said first zone at predetermined spaced intervals, a lesser number of radiant heating elements located in said second zone and spaced further apart and a number of heater elements located in said third zone spaced still further apart.

5. An automatic sign baking machine in accordance with claim 1, wherein said high pressure after-cooler stage comprises means for forcing air at high pressure transversely across the line of movement of work and above the work, means for confining said high pressure air above the work whereby there will be no leakage of air from below the work to the space above the work and with respect to such leakage as does occur it will be downwardly and from the space above the work to the space below the work.

6. A method of making a sign comprising imparting motion to the sign in a predetermined direction, moving said sign beneath a spray of solidifiable thermosetting binder, continuing to pass said sign in the same line of travel beneath a sphere loader and feeding spheres to said uncongealed binder, continuing the motion of said sign to a heating zone wherein said binder passes from an "A" stage to a "B" stage in a relatively short distance, continuing the motion of said sign through a second baking stage of longer distance where said binder passes from a "B" stage to a "C" stage, thereafter continuing the motion of said sign in the same direction of travel and passing high pressure cooling air over said sign transversely of its line of travel.

7. An apparatus for applying coatings to metal workpieces such as signs and the like comprising a first stage including means for spraying a resinous binder onto the workpieces and means for collecting sprayed binder which does not adhere to the workpieces, a second stage closely following said first stage and including means for applying a controlled quantity of reflectorizing material to the binder-coated surface of the workpieces, a third stage closely following said second stage and including an oven having a plurality of successively decreasing heat zones, and conveyor means for moving the workpieces successively through said three stages.

8. An apparatus as defined in claim 7, wherein said second stage includes means for dispensing bead-like reflectorizing elements including a hopper for holding a supply of said elements, a knurled rotor positioned to receive elements from said hopper, and means shielding said rotor whereby said elements are confined and protected from moisture in the atmosphere during the feeding and loading operation.

9. An apparatus as defined in claim 7, wherein said third stage is divided into a first, second and third zone, a predetermined number of radiant heating elements located in said first zone at predetermined spaced intervals, a predetermined number of radiant heating elements located in said second zone, and spaced further apart than the heating elements of said first zone, and a predetermined number of heating elements located in said third zone and spaced further apart than said heating elements of said second zone.

10. An apparatus as defined in claim 7, wherein said third stage is divided into a plurality of heating zones including a first zone of high heat concentration and a plurality of additional zones following said first zone of successively lower heat concentration.

11. An apparatus for applying coatings to metal workpieces such as signs and the like comprising a first stage including means for spraying a resinous binder onto the workpieces and means for collecting sprayed binder which does not adhere to the workpieces, a second stage closely following said first stage and including means for applying a controlled quantity of reflectorizing material to the binder-coated surface of the workpieces, a third stage closely following said second stage and including an oven having a plurality of successively decreasing heat zones, a fourth stage closely following said third stage and including means for cooling the workpieces, and conveyor means for moving the workpieces successively through said four stages.

12. An apparatus as defined in claim 11, wherein said fourth stage includes means for forcing air at high pressure transversely across the line of movement of the work and above the work, means for confining said high pressure air above the work whereby there is no leakage of air from below the work to the space above the work and whereby such leakage as does occur is downwardly and from the space above the work to the space below the work.

13. An apparatus for applying coatings to metal workpieces such as signs and the like comprising a first stage including means for spraying a resinous binder onto the workpieces and means for collecting sprayed binder which does not adhere to the workpieces, a second stage closely following said first stage and including means for applying a controlled quantity of reflectorizing material to the binder-coated surface of the workpieces, a third stage closely following said second stage and including an oven having a plurality of successively decreasing heat zones, and conveyor means for moving the workpieces successively through said three stages, said conveyor means including separate conveyors for said first and third stages.

14. An apparatus for applying coatings to metal workpieces such as signs and the like comprising a first stage including means for spraying a resinous binder onto the workpieces and means for collecting sprayed binder which does not adhere to the workpieces, a second stage closely following said first stage and including means for applying a controlled quantity of reflectorizing material to the binder-coated surface of the workpieces, a third stage closely following said second stage and including an oven having a plurality of successively decreasing heat zones, a fourth stage closely following said third stage and including means for cooling the workpieces, and conveyor means for moving the workpieces successively through said four stages, said conveyor means including separate conveyors for said first and third stages.

15. A method of applying a reflectorizing coating to a metal workpiece, such as a sign or the like, comprising the steps of imparting motion to the workpiece in a predetermined direction moving said workpiece beneath a spray of solidifiable thermosetting binder to apply a binder coating thereon, continuing to pass said workpiece in the same line of travel beneath a reflectorizing sphere loader and feeding spheres to said binder coating on said workpiece while the binder is still in an uncongealed or "A" stage, continuing the motion of said workpiece to a first heating zone wherein the binder passes from an "A" stage to a "B" stage in a relatively short distance, and continuing the motion of said workpiece through a second heating zone of longer length than said first heating zone, whereby the binder passes from a "B" stage to a "C" stage.

16. A method of applying a reflectorizing coating to a metal workpiece, such as a sign or the like, comprising the steps of imparting motion to the workpiece in a predetermined direction moving said workpiece beneath a spray of solidifiable thermosetting binder to apply a binder coating thereon, continuing to pass said workpiece in the same line of travel beneath a reflectorizing sphere loader and feeding spheres to said binder coating on said workpiece while the binder is still in an uncongealed or "A" stage, continuing the motion of said workpiece to a first heating zone wherein the binder passes from an "A" stage to a "B" stage in a relatively short distance, continuing the motion of said workpiece through a second heating zone of longer length than said first heating zone whereby the binder passes from a "B" stage to a "C" stage, and thereafter continuing the motion of said workpiece in the same direction of travel and passing high pressure cooling air over said workpiece transversely of its line of travel.

References Cited in the file of this patent

UNITED STATES PATENTS

| | | |
|---|---|---|
| 1,785,322 | McQuiston | Dec. 16, 1930 |
| 1,870,041 | Dike | Aug. 2, 1932 |
| 1,998,055 | McBurney et al. | Apr. 16, 1935 |
| 2,288,585 | Partee et al. | June 30, 1942 |
| 2,303,202 | Faris et al. | Nov. 24, 1942 |
| 2,466,870 | Twiehaus et al. | Apr. 12, 1949 |
| 2,661,303 | Fasold et al. | Dec. 1, 1953 |
| 2,664,901 | Gehr et al. | Jan. 5, 1954 |
| 2,732,883 | Morrison et al. | Jan. 31, 1956 |
| 2,763,275 | Cummings | Sept. 18, 1956 |
| 2,870,739 | Rodli | Jan. 27, 1959 |
| 2,889,806 | Conant | June 9, 1959 |
| 2,992,514 | Couch et al. | July 18, 1961 |

Dedication 3,168,412.—*John R. Wald, Jr., Rufus W. Wilson,* and *Robert B. Bagshaw,* Huntingdon, Pa. REFLECTORIZING APPARATUS AND METHOD. Patent dated Feb. 2, 1965. Dedication filed Apr. 13, 1976, by the assignee, *Prismo Universal Corporation.*

Hereby dedicates to the Public the entire term of said patent.

[*Official Gazette July 6, 1976.*]